United States Patent
De Rycke et al.

(10) Patent No.: US 9,439,358 B2
(45) Date of Patent: Sep. 13, 2016

(54) BALER AND AN EJECTION ARRANGEMENT FOR A BALER

(71) Applicant: CNH America LLC, New Holland, PA (US)

(72) Inventors: Stefan De Rycke, Zulte (BE); Peter Vanhoutte, Varsenare (BE); Robrecht M. K. Dumarey, Gistel (BE)

(73) Assignee: CNH Industrial America LLC, New Holland, PA (US)

( * ) Notice: Subject to any disclaimer, the term of this patent is extended or adjusted under 35 U.S.C. 154(b) by 699 days.

(21) Appl. No.: 13/786,362

(22) Filed: Mar. 5, 2013

(65) Prior Publication Data
US 2013/0233187 A1   Sep. 12, 2013

(30) Foreign Application Priority Data
Mar. 6, 2012   (BE) .................................. 2012/0144

(51) Int. Cl.
*A01F 15/08*   (2006.01)
*B30B 9/30*   (2006.01)

(52) U.S. Cl.
CPC ......... *A01F 15/0875* (2013.01); *B30B 9/3014* (2013.01)

(58) Field of Classification Search
CPC .................. A01F 15/0875; B30B 9/3014
USPC ........... 100/7, 188 R, 191, 218; 56/341, 343, 56/361, 474; 414/111, 497, 509, 511, 512, 414/517
See application file for complete search history.

(56) References Cited

U.S. PATENT DOCUMENTS

| 4,549,840 | A | * | 10/1985 | Ansbjer ............... A01D 90/083 198/744 |
| 4,791,865 | A | | 12/1988 | Naaktgeboren |
| 5,540,144 | A | | 7/1996 | Schrag et al. |
| 7,093,537 | B2 | * | 8/2006 | Dubois ................. A01F 15/085 100/188 R |
| 7,779,755 | B2 | | 8/2010 | De Rycke |
| 2005/0172838 | A1 | | 8/2005 | Dubois |
| 2013/0014655 | A1 | * | 1/2013 | Dumarey ............ A01F 15/0875 100/218 |

FOREIGN PATENT DOCUMENTS

| NL | 8801271 | 12/1989 |
| WO | WO/2011/042332 | 4/2011 |

* cited by examiner

*Primary Examiner* — Jimmy T Nguyen
(74) *Attorney, Agent, or Firm* — Patrick M. Sheldrake (57) ABSTRACT

A rectangular baler comprising a bale chamber; a compacting plunger moveable between a retracted position and an extended position; an ejection arrangement provided in a wall comprising a shuttle assembly with at least one dog mounted for protruding from said wall when the shuttle assembly is moving from a rest position in the forward direction to move one or more bales forward; wherein at least one end dog is located in the rest position of the shuttle assembly in a zone near of the plunger in the extended position thereof, such that when the shuttle assembly moves in the forward direction, said at least one end dog is engageable behind a bale adjacent the inlet of the bale chamber.

16 Claims, 9 Drawing Sheets

BALER AND AN EJECTION ARRANGEMENT FOR A BALER

This Patent Application claims priority under 35 U.S.C. §119 to Belgian Application BE 2012/0144, filed on Mar. 6, 2012 titled, "Baler and an ejection arrangement for a baler" and having Stefan De Rycke, Peter Vanhoutte, and Robrecht M. K. Dumarey as inventors. The full disclosure of BE 2012/0144 is hereby fully incorporated herein by reference.

TECHNICAL FIELD

The present invention relates to a baler, in particular a rectangular baler, to an ejection arrangement for use in a baler and to a shuttle assembly for use in a baler.

BACKGROUND ART

In rectangular balers bales are formed by compressing crop material in a bale chamber or bale case by a plunger which is reciprocable with the bale chamber. At the end of a baling session one or more bales may be left in the bale chamber, and it may be desirable to remove those one or more bales from the bale chamber. To that end it is known to provide an ejection system in the bale chamber. Such an ejection system comprises one or more reciprocable shuttle assemblies each provided with bale engaging means, also called dogs or tines adapted to engage in the bale when the corresponding shuttle assembly moves in a forward direction and to disengage the bale when the shuttle assembly moves in a backward direction.

An example of an ejection system with one shuttle assembly is disclosed in EP 0 264 497 B1 in the name of the Applicant. An example with two shuttle assemblies is disclosed in EP 2 108 246 B1 in the name of the Applicant. The provision of a second shuttle assembly which reciprocates near the discharge outlet of the bale chamber has the advantage that the bale(s) nearest the discharge outlet can be ejected in an improved way. WO 2011/042332, also in the name of the Applicant discloses an advantageous dog for use in an ejector system.

The bale engaging means, also called dogs or tines may be freely rotatable around a pivot point in the shuttle assembly, see e.g. EP 0 264 497 B1, EP 2 108 246 B1 and WO 2011/042332. Alternatively, the dogs may be spring-biased such as in U.S. Pat. No. 5,540,144 and NL 8801271. Further, U.S. Pat. No. 7,093,537 discloses an ejector system using a first lath and a second lath arranged above each other. The conveyor elements or dogs are connected pivotally to both laths. During operation the cylinder will first move one lath with respect to the other lath to bring the dogs in an extended position to engage in the bale, whereupon both laths are moved together to advance the bale.

The problems with the ejector systems of the prior art are:
  slippage may occur during the first strokes of the shuttle assembly due to the fact that the projecting tips of the dogs do not properly engage in the bales. This may lead to damage of the bales; and/or
  the complexity of the system; and/or
  the lack of robustness.

SUMMARY

The object of the invention is to provide a baler which addresses at least one of the above mentioned problems by providing an ejection arrangement which is robust, simple and has an improved ejection efficiency.

According to an aspect of the invention there is provided a baler, in particular a rectangular baler, comprising a bale chamber, a compacting plunger and an ejection arrangement. The bale chamber has an inlet and a discharge outlet and is delimited by a plurality of walls. The compacting plunger is adapted for advancing crop material in a forward direction towards the discharge outlet, and is moveable between a retracted position and an extended position. The ejection arrangement is provided in a wall of said plurality of walls, and comprises a shuttle assembly with at least one dog, also called tine or bale engaging means. The shuttle assembly is mounted for reciprocating in the forward direction and back. The at least one dog is mounted for protruding from said wall when the shuttle assembly is moving from a rest position in the forward direction to move a bale towards the discharge outlet. The at least one dog comprises at least one end dog located in a position which is such that when the shuttle assembly moves in the forward direction, said at least one end dog is engageable substantially behind a bale at the inlet of the bale chamber. Note that it may be necessary to reciprocate the shuttle assembly a number of times before the at least one end dog has sufficient impact on the one or more bales to move the bales. It may be that the at least one end dog will only engage properly behind the bale e.g. after the first reciprocating movement of the shuttle assembly, and that the one or more bales are only moved after the first reciprocating movement.

Preferably the at least one end dog is located, in the rest position of the shuttle assembly, in a zone near the extended position of the plunger. More in particular, the position with respect to the extended position of the plunger is such that when the shuttle assembly moves in the forward direction, said at least one end dog is engageable substantially behind a bale at the inlet of the bale chamber.

In this context the term "substantially behind" or "behind" refers to the fact that there is little or no bale material behind the end dog, contrary to prior art dogs which engage in the body of a bale.

Such an embodiment has the advantage that the eject force generated by the at least one dog is increased and that slippage problems are reduced compared to conventional ejection arrangements.

According to a preferred embodiment, in the rest position of the shuttle assembly, the at least one end dog is located at least partially in an area surrounding the plunger, when the plunger is in the extended position. In that way, the end dog(s) will be able to project from a wall of the bale chamber immediately adjacent the extended position of the plunger assembly, i.e. at the inlet end of the bale chamber, such that they can engage behind a bale and exert a pushing force on the bale nearest the inlet. Preferably, the shuttle assembly is arranged in the bottom wall of the bale chamber, in which case the at least one end dog is located at least partially underneath the plunger.

According to a possible embodiment, in the rest position of the shuttle assembly and in the extended position of the plunger, there can be defined a zone in which the at least one end dog should be located for the end dog(s) to engage substantially behind the bale nearest the inlet. Preferably this zone extends less than 20 cm from the plunger in the forward direction, most preferably less than 10 cm. Note that an end dog may be located at least partly underneath the plunger, and that the zone will typically also extend underneath the plunger.

According to a preferred embodiment the shuttle assembly comprises a plurality of first elongated members. Each first elongated member typically carries at least one end dog and a number of further first dogs arranged across the length of the first elongated member. Preferably each first elongated member extends over substantially the full length of the bale chamber between the extended position of the plunger and the discharge outlet, minus the stroke of the shuttle assembly.

According to a preferred embodiment each first elongated member comprises a first elongated bar and a second elongated bar extending over a part of the first bar. The first bar has an inner side and an outer side extending in a plane perpendicular to the wall and parallel to the forward direction. The second bar has an inner side and an outer side, and the second bar is fixed with its inner side against the outer side of the first bar.

According to a preferred embodiment the ejection arrangement further comprises a second shuttle assembly. The second shuttle assembly typically comprises a plurality of second elongated members extending over a part of the length of the bale chamber near the discharge outlet. Each second elongated member may carry a number of second dogs arranged across the length of the second elongated member. Preferably each second elongated member is located adjacent a first elongated member of the first shuttle assembly.

According to a preferred embodiment the ejection arrangement comprises a first and a second shuttle assembly as detailed above. Each second elongated member may be formed by a third elongated bar which is arranged in line with said second bar. The third bar has an inner side and an outer side, and is preferably mounted for moving with its inner side along the outer side of said first bar.

According to a preferred embodiment the at least one end dog comprises a plurality of pairs of end dogs. For each pair, there is one end dog mounted at either side of each first elongated member. In the embodiment with a first and a second bar, one end dog may be provided at the inner side of the first bar and one at the outer side of the second bar. Further a number of first dogs may be mounted at the inner side and/or at the outer side of the first bar; and a number of second dogs may be mounted at the outer side of the third bar.

The invention also relates to an ejection arrangement and shuttle assembly as described above for use in an embodiment of a baler.

Also the invention relates to a method for ejecting one or more bales out of a bale chamber of a rectangular baler comprising reciprocating a shuttle assembly in the bale chamber in a forward direction and back. During the movement in the forward direction at least one end dog is made to engage behind said one or more bales to push said one or more bales in the forward direction. In other words an end dog will engage substantially behind a bale and not in the body of the bale. According to preferred embodiments, during the movement of the shuttle assembly in the forward direction, also a number of further dogs is made to protrude from a wall of the baling chamber in said one or more bales to move said one or more bales in the forward direction towards an outlet.

According to another aspect of the invention there is provided an ejection arrangement for use in a baler. The ejection arrangement comprises a first shuttle assembly comprising a plurality of first elongated members and a second shuttle assembly comprising a plurality of second elongated members. Each first elongated member comprises a first bar having a length and a second bar extending over a part of the length of the first bar. The first bar has an inner side and an outer side extending in a plane perpendicular to the wall and parallel to the advance direction. The second bar has an inner side and an outer side, and is fixed with the inner side thereof against the outer side of the first bar. Each second elongated member is formed by a third bar having an inner side and an outer side, and the third bar is mounted in line with the second bar and is mounted for moving with its inner side along the outer side of said first bar.

Such an embodiment of an ejection arrangement with two shuttle assemblies has the advantage of being very robust. Further such a construction limits the tendency of the elongated members to flex whilst reciprocating.

Now an advantageous embodiment of a dog assembly for use in a shuttle assembly of a baler will be described. Preferably each dog of the at least one dog is mounted pivotally around a pivot axis on the shuttle assembly and is provided at a lower part with a guiding element. Further, there is provided in the wall of the bale chamber, a guidance member adapted to cooperate with the guiding element to force the dog to pivot out of the wall when the shuttle assembly moves from the rest position in the forward direction.

Such an embodiment has the advantage that the dogs are erected actively during the forward stroke without requiring an additional actuator or requiring the dogs to permanently protrude into the bale chamber.

According to a preferred embodiment of the dog assembly, the guidance member has a guide surface extending downward and forward in the forward direction such that the guiding element is pushed downward and forward when the shuttle assembly moves in the forward direction. This causes the dog to rotate and to project out of the wall. Said guidance member is preferably a spring-biased guidance block, and the guiding element and guidance block are preferably mounted and shaped such that, when the shuttle assembly moves back from an advanced position to the rest position, the guiding element pushes the guidance block away to return to an initial position against the guide surface.

According to a preferred embodiment of the dog assembly the guiding element is a protrusion protruding outward from a surface of the dog, away from the shuttle assembly.

According to a preferred embodiment of the dog assembly the guidance member is mounted pivotally around a pivot axis parallel to the pivot axis of the dog, and is spring-biased against a stop located above the guidance member.

According to a preferred embodiment of the dog assembly, for each dog there is provided a stop, preferably fixed on the shuttle assembly, adapted to limit the rotation of the dog upwardly around the pivot axis of the dog.

According to a preferred embodiment of the dog assembly the dog and/or the guidance member has substantially the shape of a parallelepiped.

According to another aspect of the invention there is provided a shuttle assembly for use in a baler comprising an elongated member adapted for being reciprocated, and a dog mounted pivotally around a pivot axis connected with the elongated member of the shuttle assembly. The dog is provided at a lower part with a guiding element. The shuttle assembly further comprises a guidance member adapted for being mounted in a wall of the bale chamber and adapted to cooperate with the guiding element to force the dog to pivot out of the wall when the shuttle assembly moves from a rest position in a forward direction.

According to a preferred embodiment of the shuttle assembly the guidance member has a guide surface extending downward and forward in the forward direction, and the guidance member is a spring-biased guidance block. The guiding element and guidance block are preferably mounted and shaped such that the guiding element is guided against the guide surface when the shuttle assembly moves in the forward direction, and that the guiding element pushes the guidance block away to return to an initial position against the guide surface when the shuttle assembly moves back from an advanced position to the rest position.

BRIEF DESCRIPTION OF THE FIGURES

The accompanying drawings are used to illustrate presently preferred non-limiting exemplary embodiments of the present invention. The above and other advantages, features and objects of the invention will become more apparent and the invention will be better understood from the following detailed description when read in conjunction with the accompanying drawings in which.

Figure 1:
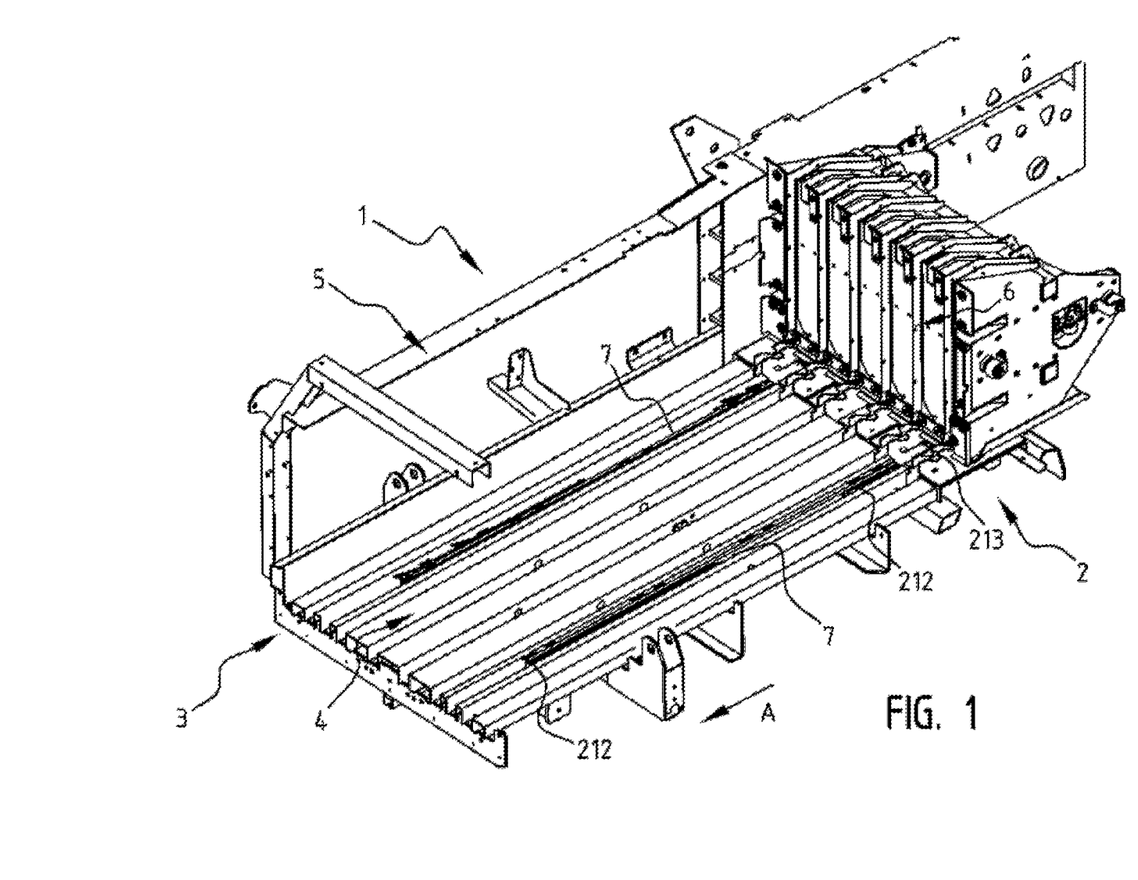
FIG. 1 is a schematic perspective plan view of an embodiment of a baler according to the invention, with the ejection arrangement in the rest position.

FIG. 1 illustrates a part of an embodiment of a baler according to the invention. Note that only the parts relevant for understanding the present invention are illustrated. Other parts which are well known to the skilled person, such as the curved supply channel, the needle assembly and the knotter devices have been omitted. The baler comprises a bale chamber 1 having an inlet 2 and an discharge outlet 3. The bale chamber is delimited by a bottom wall 4, two side walls 5 and a top wall (omitted for clarity reasons). At the inlet end of the bale chamber there is provided a compacting plunger 6 for advancing crop material in a forward direction A between a retracted position and an extended position of the plunger 6. In FIG. 1 the compacting plunger 6 is shown in the extended position. In this extended position the inlet 2 is located underneath the plunger 6.

An ejection arrangement 7 is built-in in the bottom wall 4 of the bale chamber. The integration of an ejection arrangement into a rectangular baler is e.g. described in WO 96/29195, WO 2011/042332 and EP 2 108 246 in the name of the Applicant. The following description will concentrate on the improved construction of an embodiment of an ejection arrangement of the invention, and will only describe the baler to an extent necessary for understanding the invention.

Figure 2:
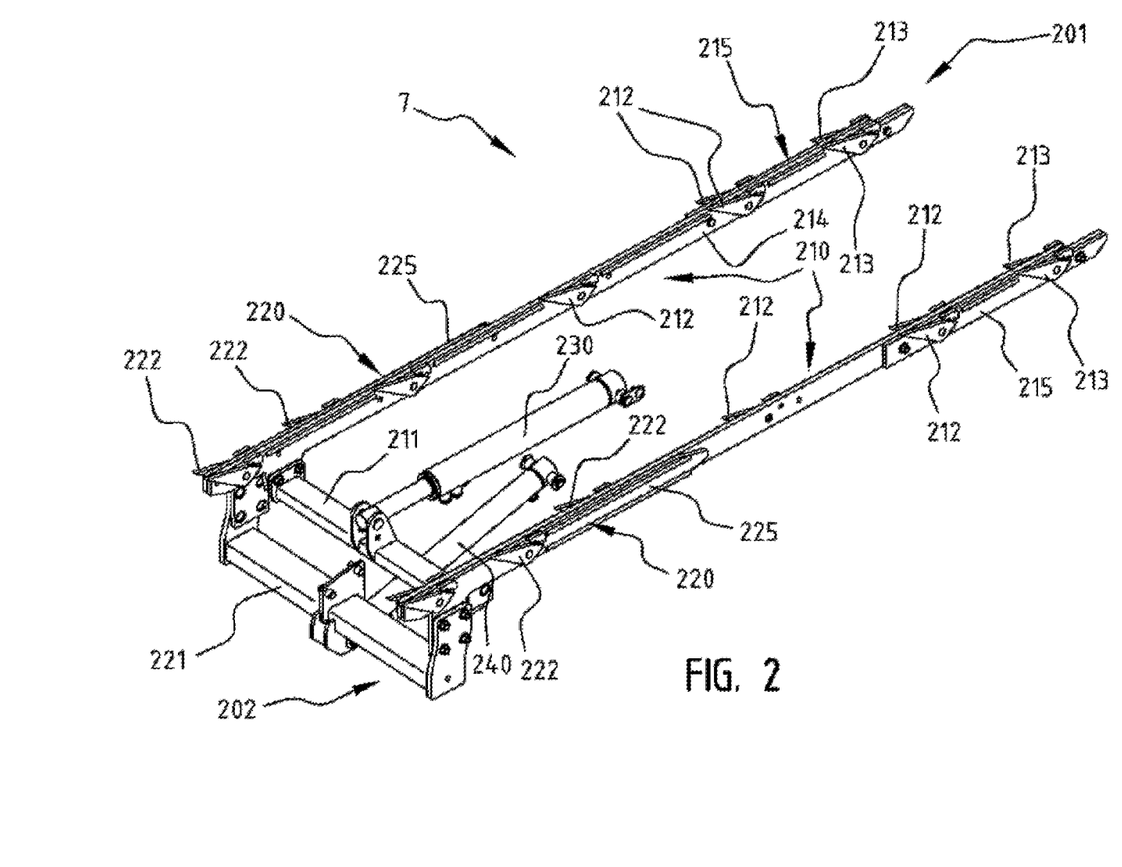
FIG. 2 is a schematic perspective plan view of an embodiment of an ejection arrangement of the invention, shown in the rest position.
Figure 3:
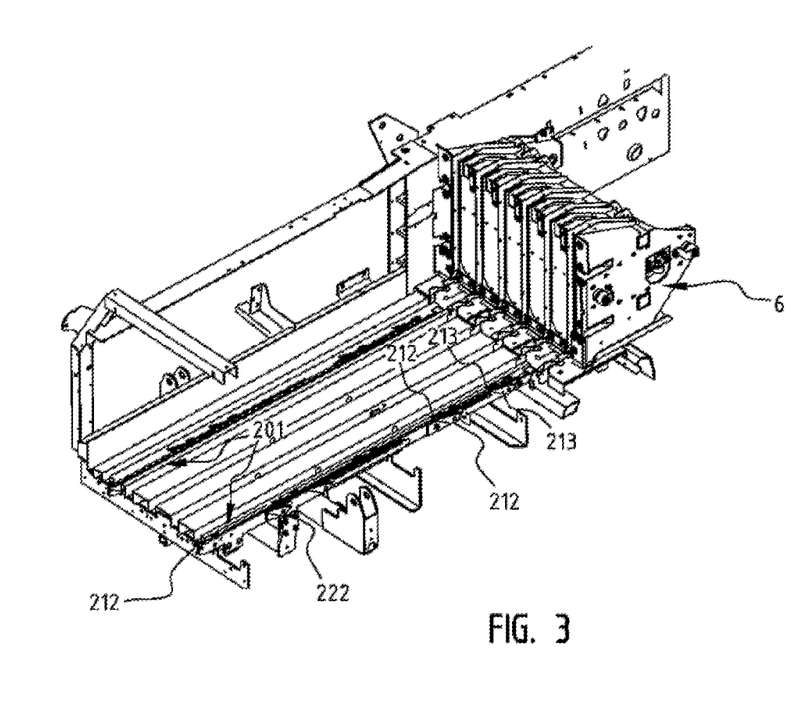
FIG. 3 is a schematic perspective plan view of the embodiment of FIG. 1, with the ejection arrangement in the advanced position, wherein a part of the bottom wall has been omitted to better illustrate the ejection arrangement.
Figure 4:
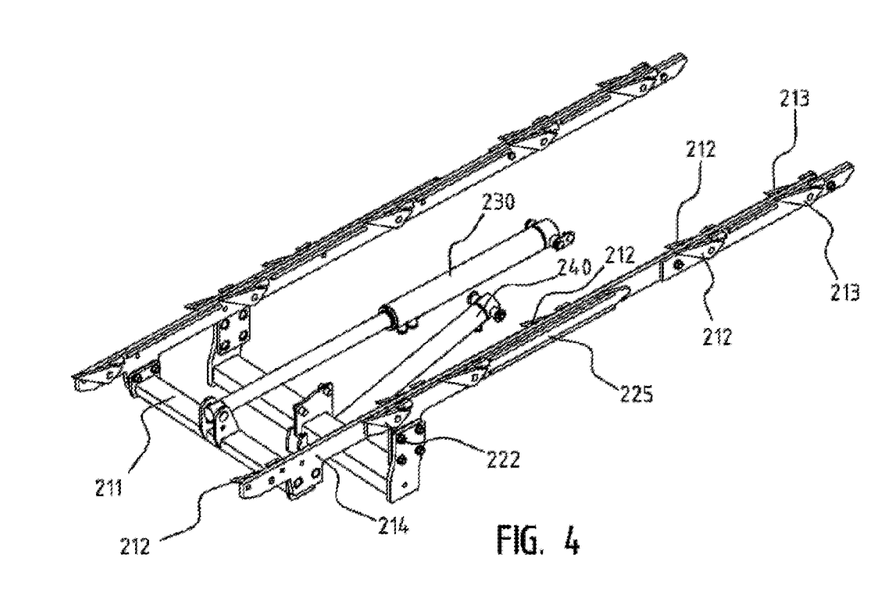
FIG. 4 is a schematic perspective plan view of the ejection arrangement of FIG. 2, shown in the advanced position.

FIGS. 2 and 4 illustrate in detail an embodiment of an ejection arrangement 7 according to the invention in the rest position and in an advanced position of a first shuttle assembly 201, respectively. The ejection arrangement 7 comprises the first shuttle assembly 201 and a second shuttle assembly 202. The first shuttle assembly 201 comprises two first elongated members 210 which are connected by a first connecting beam 211. The second shuttle assembly 202 comprises two second elongated members 220 connected by a second connection beam 221. Both the first and the second elongated members 210, 220 are provided with a set of dogs 212, 213, 222. As illustrated in FIG. 1, the elongated members 210, 220 can be arranged in channels of the bottom wall 4. The connection beams 211, 222 are located underneath the bottom wall 4 and are reciprocated by a first and second cylinder 230, 240, respectively. As can be seen in FIG. 1, the first elongated members 210 extend over more or less the full length of the bale chamber minus the stroke length of the first shuttle assembly. The second elongated members 220 extend over a part of the bale chamber at the side of the discharge outlet 3. Note that the first and second shuttle assemblies 201, 202 are illustrated in FIG. 1 in a rest position, i.e. in a retracted position. When the shuttle assemblies 201, 202 are moved in the forward direction, they will reach the discharge outlet area 3. This is illustrated in FIG. 3 which shows the ejection arrangement with the first shuttle assembly 201 in an advanced position. Note that the shuttle assemblies may be moved independently of each other, but may also be moved in dependence, e.g. simultaneously.

The first shuttle assembly 201 is provided with a number of end dogs 213 and a number of first dogs 212. The first dogs 212 and end dogs 213 are mounted for protruding from the bottom wall 4 when the shuttle assembly is moving from the rest position to the advanced position in the forward direction A to move a bale towards the discharge outlet 3. In the rest position of the first shuttle assembly 201, the end dogs 213 are located in a zone Z near the plunger 6 when positioned in the extended position. This is best visible in FIG. 5A, which illustrates a section of the bale chamber of FIG. 1 and shows the preferred zone Z for positioning the end dogs. The zone Z extends from the plunger over a limited distance in the forward direction, typically less than 20 cm, and extends underneath the plunger when the plunger is in the extended position. This zone is such that when the end dogs are located in this zone, they can engage behind a last bale in the bale chamber. In the illustrated embodiment, in the rest position of the shuttle assembly, the end dogs 213 are located at least partially underneath the plunger 6 when the plunger is in the extended position.

Figure 5A:
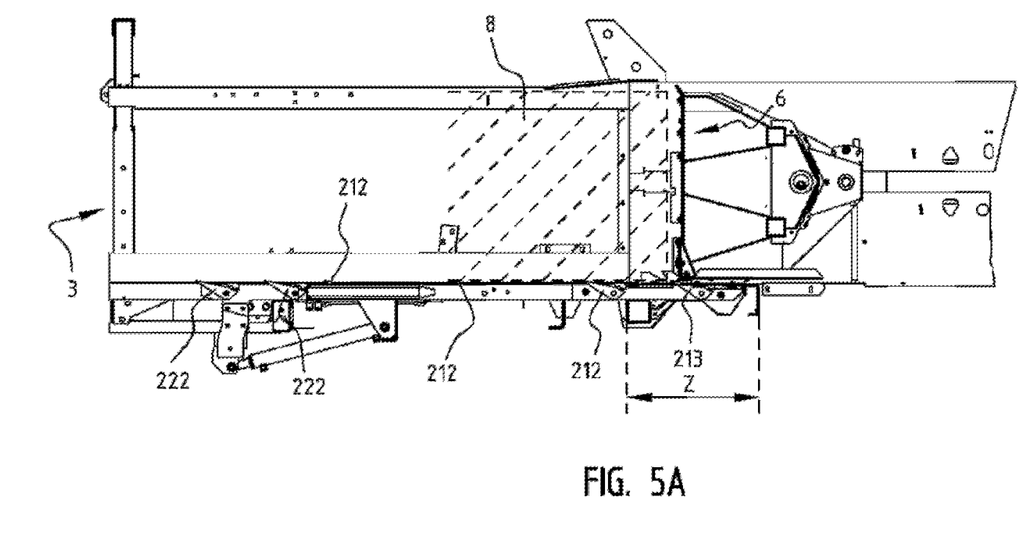
FIGS. 5A, 5B and 5C are respective schematic sections of the embodiment of FIG. 1 in consecutive positions of the ejection arrangement.
Figure 5B:
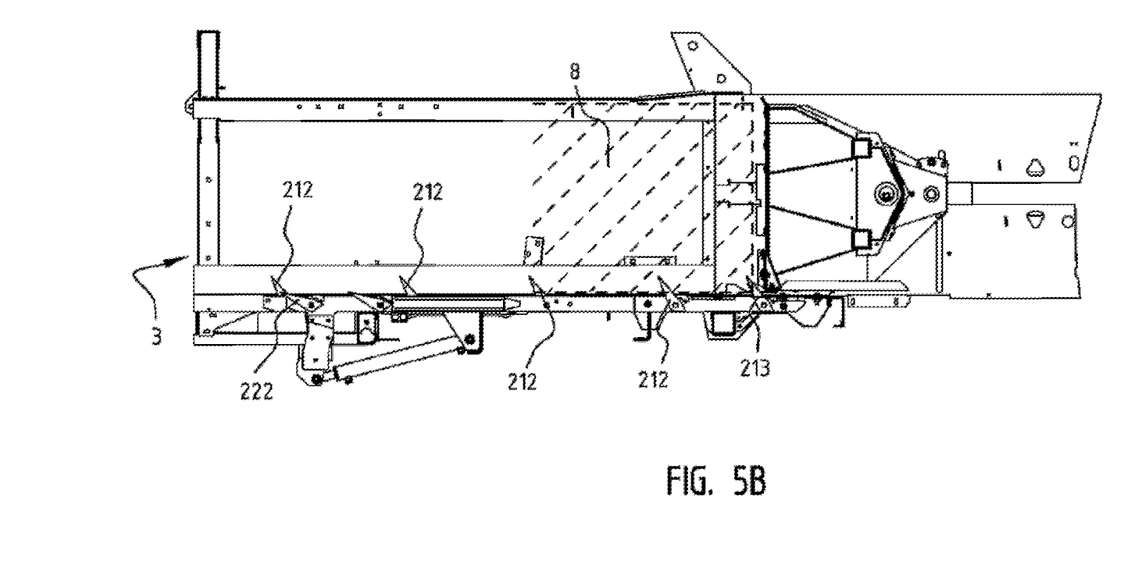
Figure 5C:
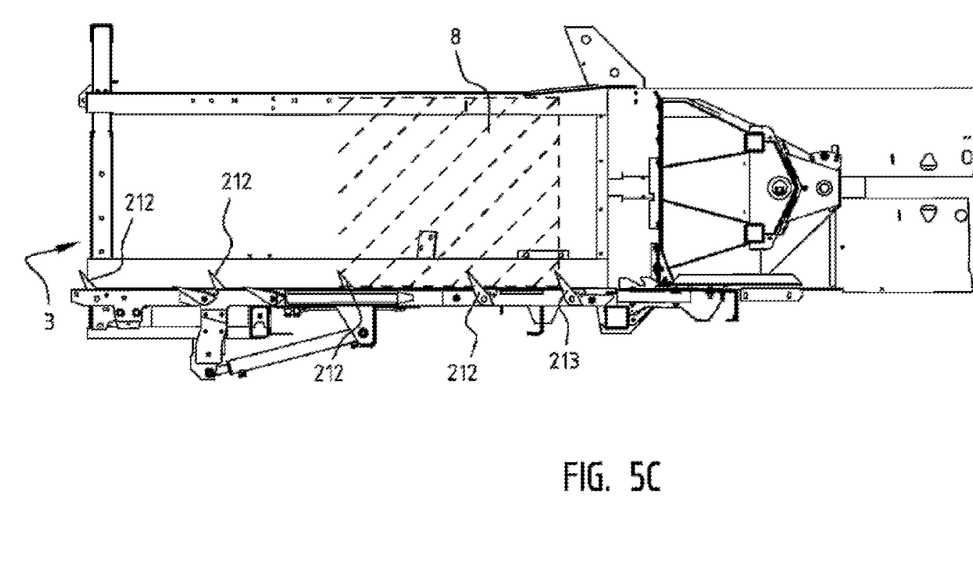

The advantage of providing end dogs 213 at this location in the bale chamber is best illustrated in FIGS. 5A-5C. FIG. 5A shows the first shuttle assembly 201 in its rest position. In FIG. 5B, the shuttle assembly 201 is moved in the forward direction A. The dogs 212, 213 move upwardly as the shuttle assembly moves forward. Note that this upward movement can either be obtained passively due to the forces exerted by the bale 8 on the dogs 212, 213, or by suitably arranged spring mechanisms or even actively by including an activation mechanism which moves the dogs upward as the shuttle assembly 201 moves forward, see further. This movement of the first shuttle assembly will cause the first dogs 212 to engage in the bale, while the end dogs 213 will be behind the bale and push the bale towards the discharge outlet 3, see FIGS. 5B and C. Conventional ejection constructions have the disadvantage that, when the shuttle assembly starts to move, it may take some time before the projecting tips of the dogs properly engage in the bales. Often, during the first reciprocating movements the dogs will merely slip relative to the bale. This slippage can create grooves in the bale which may render further attempts at gripping the bale futile. By providing end dogs 213, which can exert a pushing force on the bales, such slipping phenomenon are largely reduced or avoided.

Referring again to FIGS. 2 and 4, each first elongated member 210 comprises a first bar 214 and a second bar 215 which extends over a part of the first bar at the end near the plunger 6. The second elongated member 220 is formed by a third bar 225 which is mounted in line with the second bar 215. However, the second bar 215 is fixed to the first bar 214, while the third bar 225 is movable with respect to the first bar 214. The first bar 214 has an inner side which a first series of dogs 212, 213 are mounted, and an outer side on which the second bar 215 is fixed. On the second bar 215 a further series of dogs 212, 213 is mounted. Each dog is mounted pivotally around a pivot point. The third bar 225 is movable along the outer side of the first bar 214 and is provided on its outer side with a series of second dogs 222. Preferably all dogs 212, 213, 222 can pivot in a plane parallel to the forward direction and perpendicular to the bottom wall, between a lower position and a raised position. In the lower position the dogs may be located fully or almost fully in the bottom wall 4, and in the raised position the dogs project out of the bottom wall 4. By using a first and a second bar for each elongated member 210 of the first shuttle assembly 201, and by using in the second shuttle assembly 202 third bars in line with the second bars of the first shuttle assembly 201, a very robust set of shuttle assemblies is obtained. Such a construction has the advantage that the risk of flexing of the first elongated members 210 is reduced, leading to an improved reciprocating movement of the ejection arrangement.

FIGS. 6A-6G and FIG. 7 illustrate a preferred embodiment of a dog arrangement according to the invention. The dog arrangement comprises a dog 301, a stop 302 for the dog 301, a spring biased guidance member 303, and a stop 304 for said guidance member 303. The dog 301 is pivotally mounted around a pivot shaft 310. The pivot shaft 310 is oriented parallel to the bottom wall and perpendicular to the forward direction and is connected with an elongated member 210, 220 of a shuttle assembly 201, 202. The dog 301 is provided at its lower part with a guiding element, here a protrusion, typically in the form of a pin 311. This protrusion 311 and the guidance member 303 actively guide the movement of the dog 301 during the reciprocating movement of the shuttle assembly 201, 202 as will be explained below. The guidance member 303 is pivotally mounted in the bottom wall around a pivot shaft 330, and is arranged, seen from above, adjacent the dog 301, when the shuttle assembly is in the rest position. This shaft 330 may be connected to the frame of the baler. The guidance member 303 is spring-biased against a stop 304. The spring-biasing of the guidance member 303 is schematically indicated by a spring 332.

In the illustrated embodiment the dog is provided with a protrusion and the guidance member is provided with a guiding surface for the protrusion. The skilled person will understand that it is also possible to provide the dog with a guiding surface and the guidance member with a suitable protrusion.

Figure 6A:
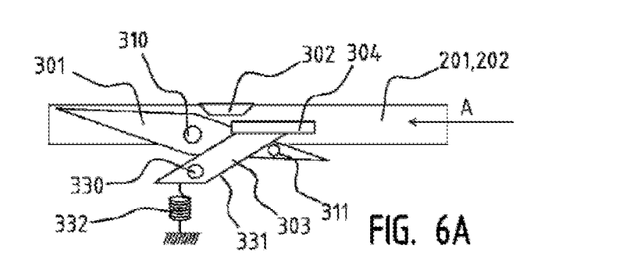
FIGS. 6A-6G illustrate schematically a preferred embodiment of a dog arrangement according to the invention in consecutive positions of the ejection arrangement.
Figure 6B:
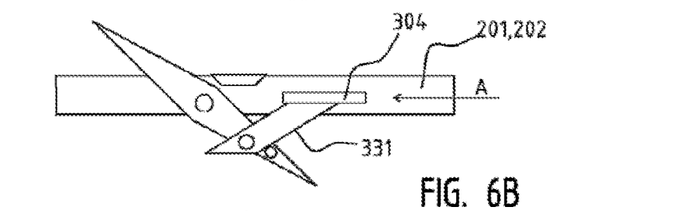
Figure 6C:
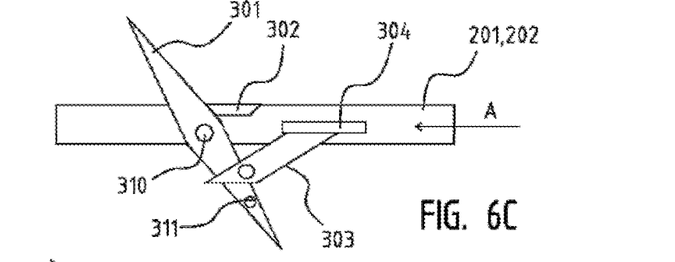

FIG. 6A illustrates the dog assembly in the rest position. In this position the dog 301 is positioned in the low position within the bottom wall of the baler. When the shuttle assembly is moved in a forward direction A, protrusion 311 abuts against a first guide surface 331 of the guidance member 303 and follows this guide surface 331. The guide surface 331 is inclined and extends downwardly and forwardly in the forward direction A. In that way the dog 301 will be rotated upwardly around pivot shaft 310 as the shuttle assembly moves forward in the forward direction A, see FIG. 6B. This upward movement of the dog 301 continues until the dog is stopped by the stop 302, see FIG. 6C.

Figure 6D:
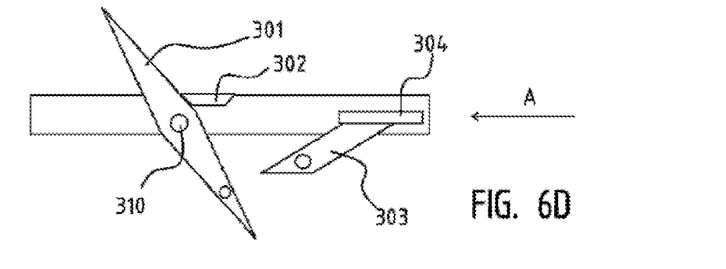
Figure 6E:
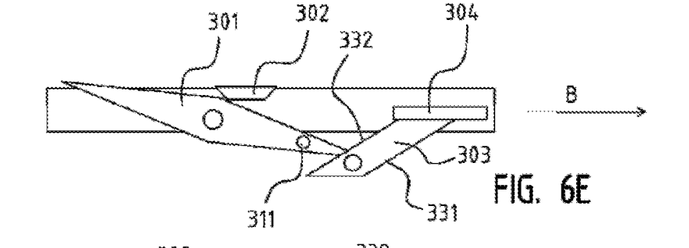
Figure 6F:
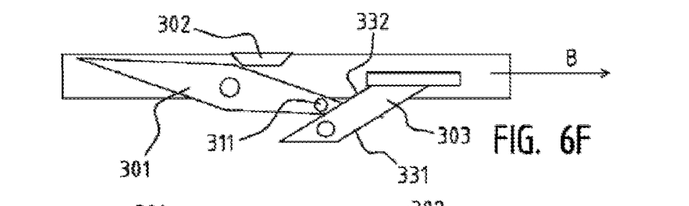
Figure 6G:
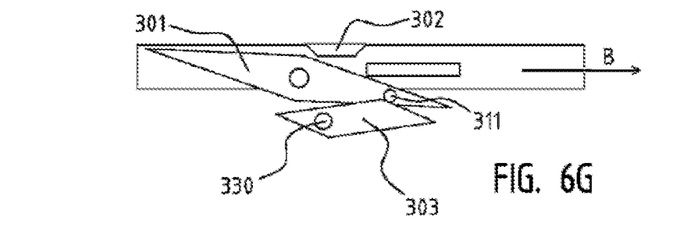

At a point where the protrusion 311 is located below the guidance member 303, the dog 301 will rise further due to the fact that it has entered partially the bale. The shuttle assembly can be further moved forward in the forward direction A, as illustrated in FIG. 6D. Upon reaching the full stroke of the shuttle assembly, the shuttle assembly 201, 202 starts the backward movement. When moving in the backward direction B, the bale will press the dog 301 in the bottom wall, see FIG. 6E. In step 6F the protrusion 311 is at the opposite side of the guide surface 331 of the guidance member 303. Opposite the first guide surface 331, the guidance member 303 is provided with a second surface 332. The protrusion 311 abuts against this second surface 332, and as the shuttle assembly continues to move backwards, the protrusion 311 will press the guidance member downward against the spring force, see FIG. 6G. When the protrusion reaches the other side of the guidance member 303, the guidance member 303 will rebound against the stop 304 to bring the dog assembly back in the rest position of FIG. 6A.

Figure 7:
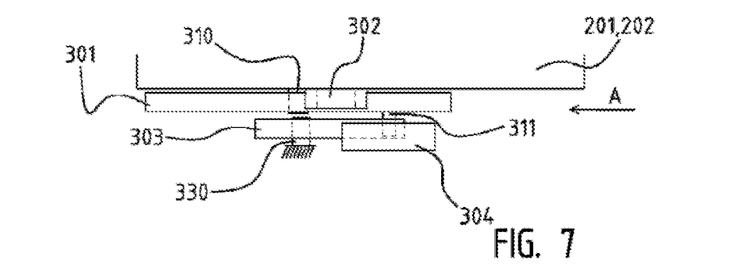
FIG. 7 is a schematic top view of the embodiment of the dog arrangement of FIGS. 6A-6G, in the position of FIG. 6A.

FIG. 7 is a top view illustrating the dog assembly of FIGS. 6A-6G. In the illustrated embodiment, the stop 304 is shown to be fixed to the frame, but the skilled person will understand that it would also be possible to fix the stop 304 to the shuttle assembly if a suitable length is chosen.

The dog assembly of FIGS. 6 and 7 has the advantage that the dog is made to actively protrude out of the bottom wall when the shuttle assembly is moved in the forward direction. This improves the engagement between the dog and the bale and allows for the dogs to be taken up fully in the bottom wall when a shuttle assembly is moving backward or when a shuttle assembly is not in use. Such a dog assembly can be used both for the end dogs 213 and the other dogs 212, 222.

In the examples above the ejection arrangement is built-in in the bottom wall of the bale chamber. The skilled person will understand that it is also possible to arrange the ejection arrangement in another wall. Further particular types and shapes of dogs have been illustrated but the skilled person will understand that other types can also be used in embodiments of the invention. Further the end dogs could have a different shape and could be formed to extend laterally over a part of the width of the bale chamber.

While the principles of the invention have been set out above in connection with specific embodiments, it is to be understood that this description is merely made by way of example and not as a limitation of the scope of protection, which is determined by the appended claims.

The invention claimed is:

1. A rectangular baler comprising:
    a bale chamber having an inlet and a discharge outlet and being delimited by a plurality of walls, said bale chamber being adapted to contain one or more bales;
    a compacting plunger for advancing crop material in a forward direction towards the discharge outlet, said plunger being moveable between a retracted position and an extended position;
    an ejection arrangement provided in a wall of said plurality of walls, said ejection arrangement comprising a shuttle assembly with a plurality of dogs; said shuttle assembly being mounted for reciprocating in the forward direction and back;
    said plurality of dogs being mounted for protruding from said wall when the shuttle assembly is moving from a rest position in the forward direction to move said one or more bales towards the discharge outlet;
    wherein said plurality of dogs comprise at least one end dog located in the rest position of the shuttle assembly in a zone near the plunger in the extended position thereof, such that when the shuttle assembly moves in the forward direction, said at least one end dog is configured to engage a vertical rear surface of a bale of said one or more bales, which is adjacent the inlet of the bale chamber.

2. A rectangular baler according to claim 1, wherein, in the rest position of the shuttle assembly, said at least one end dog is located at least partially in an area surrounding the plunger, when the plunger is in the extended position.

3. A rectangular baler according to claim 2, wherein said wall is a bottom wall, and wherein in the rest position of the shuttle assembly, said at least one end dog is located at least partially underneath the plunger, when the plunger is in the extended position.

4. A rectangular baler according to claim 1, wherein said shuttle assembly comprises a plurality of first elongated members; and wherein each first elongated member carries at least one end dog of said plurality of dogs and a number of first dogs arranged across the length of the first elongated member.

5. A rectangular baler according to claim 4, wherein each first elongated member comprises a first bar and a second bar, the second bar extending over a part of the first bar, said first bar having an inner side and an outer side extending in a plane perpendicular to the wall and parallel to an advance direction, said second bar having an inner side and an outer side; said second bar being fixed with the inner side against the outer side of said first bar.

6. A rectangular baler according to claim 4, further comprising a second shuttle assembly comprising a plurality of second elongated members extending over a part of the length of the bale chamber located near the discharge outlet; and wherein each second elongated member carries a number of second dogs arranged across the length of the second elongated member.

7. A rectangular baler according to claim 6, wherein each second elongated member is located adjacent a first elongated member of said plurality of first elongated members.

8. A rectangular baler according to claim 5, wherein each second elongated member is formed by a third bar arranged in line with said second bar, wherein said third bar has an inner side and an outer side, and wherein said third bar is mounted for moving with its inner side along the outer side of said first bar.

9. A rectangular baler according to claim 4, wherein said at least one end dog comprises a plurality of pairs of end dogs, one mounted at opposite side of each elongated first member.

10. A rectangular baler according to claim 8, wherein for each pair of end dogs, one thereof is mounted at the inner side of said first bar and one is mounted at the outer side of the second bar; wherein said number of first dogs is mounted at least one of the inner side and the outer side of said first bar;

wherein a number of second dogs is mounted at the outer side of the third bar.

11. A rectangular baler according to claim 1, wherein each dog of said plurality of dogs is mounted pivotally around a pivot axis on the shuttle assembly and is provided at a lower part with a guiding element, wherein there is provided in the wall of the bale chamber a guidance member adapted to cooperate with the guiding element to force the dog to pivot out of the wall when the shuttle assembly moves from the rest position in the forward direction.

12. A rectangular baler according to claim 11, wherein the guidance member has a guide surface extending downward and forward in the forward direction.

13. A rectangular baler according to claim 12, wherein said guidance member is a spring-biased guidance block, wherein the guiding element and guidance block are mounted and shaped such that, when the shuttle assembly moves back from an advanced position to the rest position, the guiding element pushes the guidance block away to return to an initial position against the guide surface.

14. A rectangular baler according to claim 11 wherein the guiding element is a protrusion protruding outward from a surface of the dog, away from the shuttle assembly.

15. A rectangular baler according to claim 11, wherein the guidance member is mounted pivotally around a pivot axis parallel to the pivot axis of the dog, and is spring-biased against a stop located above the guidance member.

16. A rectangular baler according to claim 11, wherein for each dog there is provided a stop adapted to limit the rotation of the dog upwardly around the pivot axis of the dog.

* * * * *